United States Patent [19]

Matsumura et al.

[11] 3,878,177

[45] Apr. 15, 1975

[54] METHOD FOR ACCELERATING LACTONIZATION

[75] Inventors: Yasuo Matsumura; Kunio Maruyama, both of Okayama, Japan

[73] Assignee: Japan Exlan Company Limited

[22] Filed: Dec. 15, 1971

[21] Appl. No.: 208,398

[30] Foreign Application Priority Data
Dec. 29, 1970 Japan.............................. 45-125337

[52] U.S. Cl................ 260/79.3 MU; 260/78.3 UA; 260/80.75; 260/85.5 R
[51] Int. Cl....................... C08f 27/00; C08g 17/02
[58] Field of Search...260/79.3 MU, 85.5 ES, 85.5 R, 260/343.5, 343.6, 343.9, 80.75

[56] References Cited
UNITED STATES PATENTS

| | | | |
|---|---|---|---|
| 3,436,406 | 4/1969 | Nakahara.......................... | 260/343.9 |
| 3,511,855 | 5/1970 | Merger ............................. | 260/343.9 |
| 3,515,706 | 6/1970 | Minato............................ | 260/85.5 R |
| 3,717,603 | 2/1973 | Matsumura.................. | 260/29.6 AB |

OTHER PUBLICATIONS

Thorne et al., Inorganic Chemistry, published by Interscience Publishers, Inc., New York, N.Y. (1954) pages 26–27.

Primary Examiner—Harry Wong, Jr.
Attorney, Agent, or Firm—Wenderoth, Lind & Ponack

[57] ABSTRACT

The present invention is directed to a method for lactonizing a vinyl copolymer containing a vinyl monomer having nitrile groups and a monomer having hydroxyl groups and/or a monomer capable of forming hydroxyl groups or an article shaped from said copolymer by treating the same in an acid medium so that lactone rings are formed in said copolymer or shaped article, characterized by adding a transition metal ion such as zinc or copper to said acid medium. By the addition of the transition metal in the acid medium, the lactonizing reaction is greatly accelerated.

8 Claims, No Drawings

METHOD FOR ACCELERATING LACTONIZATION

This invention relates to a method of accelerating a lactonizing reaction in a polymer. More particularly the present invention relates to a process for industrially advantaneously producing a polymer in which a lactone ring is formed or its shaped article by treating in an acid medium a vinyl copolymer containing a vinyl monomer having a nitrile group and a monomer having a hydroxyl group and/or a monomer capable of forming a hydroxyl group or an article shaped from said copolymer so that the lactone ring may be formed in said copolymer or shaped article, characterized by adding a metal ion to said acid medium.

In U.S. Pat. No. 3,515,706 there is disclosed that when an acrylic copolymer consisting of acrylonitrile and a monomer having a hydroxyl group or a monomer capable of forming a hydroxyl group is treated in a medium containing an acid low in oxidizability in a concentration less than 40 % and at a pH less than 2, there are selectively formed lactone rings in the copolymer. Thus, for example, when a copolymer of acrylonitrile and vinyl acetate is treated under the above described acid-treating conditions, a vinyl acetate unit part and an acrylonitrile unit part adjacent to it in a high molecular weight chain will be selectively hydrolyzed and will then be lactonized but substantially no other secondary reaction will occur.

However, in such lactonizing reaction, in order to complete the reaction, the time required for the treatment is so long that there has been a problem in adopting such method as an industrial process for producing lactonized acrylic polymers.

We have now found that, when a very slight amount of a metal ion which can form a complex with a nitrile group, such zinc, a copper or cadmium ion is made to be present in an acid-treating medium, the lactonizing reaction will be remarkably accelerated.

A principle object of the present invention is to provide a method of accelerating lactonizing reactions.

Another object of the present invention is to quickly and industrially advantageously produce lactonized polymer products by accelerating the formation of lactone rings in a high molecular weight main chain.

Still another object of the present invention is to quickly and industrially advantageously produce lactonized polymer products by accelerating the formation of lactone rings by carrying out a lactonizing reaction in an acid medium containing a transition metal ion.

Further objects of the present invention will become apparent from the following description.

The above mentioned objects of the present invention are attained by introducing a metal ion present in an acid medium for treating a vinyl copolymer containing a vinyl monomer having nitrile group and a monomer having hydroxyl group and/or a monomer capable of forming hydroxyl group or an article shaped from said copolymer so that lactone rings are formed in said copolymer or shaped article.

The metal ions which can accelerate such lactonizing reaction are ions of copper, zinc, and cadmium. In the actual use of these metal ions, besides the simple substances of these elements, compounds soluble in the acid medium may be used selected from such inorganic or organic compounds as oxides, halides, salts of oxyacids of halogens, nitrates, sulfates, phosphates, sulfonates and carboxylates. Further, the use of such metals prevents the coloring of the produced lactonized polymer products.

When at least 0.001 mol/liter, preferably at least 0.01 mol/liter of such metal ions are made to be present in the acid medium, the lactonizing reaction will be favorably accelerated. The upper limit of the amount of use of said transition metal ion varies depending on the lactonizing conditions and is difficult to determine at once but is economically preferably less than 5 mol/liter.

The vinyl copolymer to be lactonized in the present invention or the article shaped from said copolymer is a copolymer obtained by copolymerizing in the presence of a well known catalyst a vinyl monomer having a nitrile group, a monomer having a hydroxyl group and/or a monomer capable of forming a hydroxyl group and further, in some cases, such monomer copolymerizable with the above mentioned vinyl monomer having a nitrile group so long as it does not adversely affect the lactonizing reaction as for example, allyl sulfonic acid or methallyl sulfonic acid or its salts; styrene; such halogen-containing monomers as vinyl chloride, vinylidene chloride or vinyl bromide, or such articles as a fiber or film shaped from said copolymer by an ordinary wet or dry spinning process.

The lactone ring formed in the polymer or the shaped article by the lactonizing reaction is a unit having the following structure

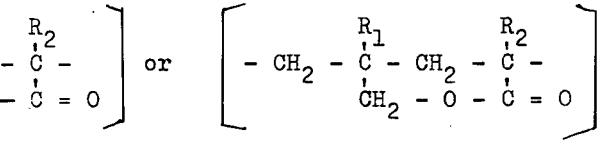

wherein each of $R_1$ and $R_2$ represents a hydrogen atom, a halogen atom, allyl, haloallyl and a cyanoallyl group et al. The lactone ring is formed by the esterifying reaction of a COOH group formed from a CN group of the vinyl monomer unit having a nitrile group and an OH group of the monomer unit having a hydroxyl group or an OH group formed from the monomer unit capable of forming a hydroxyl group.

In order to form such lactone ring, it is necessary to treat in an acid medium of a pH less than 2, a vinyl copolymer containing the vinyl monomer having a nitrile group and a monomer having a hydroxyl group and/or a monomer capable of forming a hydroxyl group or an article (for example, the fiber or film) shaped from said copolymer. The use of an acid medium of a pH higher than 2 makes the lactonizing reaction too slow. Further, in case the acid concentration in the acid medium exceeds 40 %, the decomposition of the nitrile group not contributing to the lactonizing reaction in the polymer will be also accelerated. Therefore, generally it is desirable to use an acid medium having an acid concentration less than 40 %.

The acids to be used for the acid medium may be either inorganic acids or organic acids. However, acids high in the dissociation constant, for example, such inorganic acids as sulfuric acid, hydrochloric acid, nitric acid, perchloric acid, phosphoric acid and chlorosulfonic acid and such organic acids as chloroacetic acid, formic acid, toluene sulfonic acid and phenolsulfonic acid are preferable. These acids are used as alone or as a mixture.

It is usual to carry out the lactonizing reaction in an acid medium with such acid and acid concentration as mentioned above at a treating temperature in a range from normal temperature (20°C.) to 200°C., preferably 50° to 150°C. in order to prevent the coloring and undesirable modification of the polymer or shaped article.

The amount of formation of the lactone unit in the polymer can be controlled by properly selecting the acid-treating conditions such as the acid concentration, treating temperature and treating time as well as the kind and amount of the transition metal ion to be added into the acid medium.

This acid treatment can be applied to either of a uniform system and nonuniform system. In the lactonizing treatment of a shaped article, it is natural that it is desirable to carry out the acid-treatment in a nonuniform system.

The vinyl monomers having a nitrile group are compounds having such nitrile groups and ethylenically unsaturated bonds as acrylonitrile, methacrylonitrile and α-methylene glutaronitrile. Among these compounds, acrylonitrile is favorably used. Further, the monomers having a hydroxyl group are such monomers copolymerizable with the vinyl monomers having nitrile groups as allyl alcohol and methallyl alcohol.

Further, the monomer which can produce a hydroxyl group is such monomer copolymerizable with the vinyl monomer having a nitrile group and capable of producing a hydroxyl group by being decomposed under the lactonizing conditions as vinyl or allyl compounds of carboxylic acids having 1 to 21 carbon atoms or ethers and substituted compounds thereof with halogen atoms, hydrocarbon groups or halohydrocarbon groups having 1 to 20 carbon atoms. Preferable compounds are vinyl carboxylates, allyl carboxylates, vinyl hydrocarbyl or halohydrocarbyl ethers and allyl hydrocarbyl or halohydrocarbyl ethers, said hydrocarbyl or halohydrocarbyl group having 1 to 20 carbon atoms.

Examples of said preferred unsaturated esters of carboxylic acid having 1 to 21 carbon atoms are vinyl formate, vinyl acetate, vinyl propionate, vinyl butyrate, vinyl caproate, vinyl isocaproate, vinyl caprylate, vinyl pelargonate, vinyl 2-ethyl-hexylcarboxylate, vinyl stearate, vinyl levulinate, ethylvinyl oxalate, vinyl chloroacetate, vinyl dichloroacetate, vinyl benzoate, vinyl cyclohexanecarboxylate, vinyl norbornane-2-carboxylate, allyl acetate, allyl propionate, allyl butyrate, allyl laurate, allyl benzoate, allyl cycloheptanecarboxylate, allyl chloroacetate, 2-chloroallyl acetate, isopropenyl acetate, isopropenyl butyrate, isopropenyl norbornane-2-carboxylate, α-methallyl acetate, β-methallyl acetate, γ-methallyl acetate, methallyl propionate, methylmethallyl oxalate, γ-methallyl benzoate, and 1-propenyl acetate. Among those compounds, vinyl esters of fatty acids are frequently used. The most preferable compounds are vinyl acetate and vinyl propionate.

Examples of said preferred unsaturated ethers are vinyl methyl ether, isopropenyl methyl either, β-chlorovinyl methyl ether, β-bromovinyl methyl ether, vinyl ethyl ether, isopropenyl ethyl ether, β-chlorovinyl ethyl ether, β-bromovinyl ethyl ether, vinyl 2-choroethyl ether, vinyl trifluoroethyl ether, vinyl propyl ether, vinyl isopropyl ether, β-chlorovinyl isopropyl ether, vinyl butyl ether, β-chlorovinyl butyl ether, vinyl isobutyl ether, β-chlorovinyl isobutyl ether, β-bromovinylisobutyl ether, vinyl tert-butyl ether, vinyl neopentyl ether, vinyl n-hexyl ether, vinyl 2-ethylhexyl ether, vinyl octyl ether, vinyl cyclohexyl ether, vinyl phenyl ether, α-chlorovinyl phenyl ether, vinylpmethylphenyl ether, vinyl p-chlorophenyl ether, α-bromovinyl phenyl ether, vinyl 2-chlorophenyl ether, vinyl 2,4-dichlorophenyl ether, vinyl 2,3,4-trichlorophenyl ether, vinyl α-naphthyl ether, vinyl benzyl ether, vinyl p-chlorobenzyl ether, vinyl α, α-dimethylbenzyl ether, allyl methyl ether, allyl ethyl ether, allyl 2-chloroethyl ether, allyl propyl ether, allyl isopropyl ether, allyl butyl ether, allyl isobutyl ether, allyl tert-butyl ether, allyl octyl ether, allyl phenyl ether, allyl p-chlorophenyl ether, allyl 2-chlorophenyl ether, allyl 2,4-dichlorophenyl ether, allyl α-naphthyl ether, allyl benzyl ether, methallyl methyl ether, methallyl ethyl ether, methallyl propyl ether, methallyl isopropyl ether, methallyl butyl ether, methallyl isobutyl ether, methallyl tert-butyl ether and methallyl phenyl ether. Among these compounds, vinyl alkyl ethers and vinyl haloalkyl ethers are frequently used.

The vinyl copolymer containing such vinyl monomer having a nitrile group and such monomer having a hydroxyl group and/or such monomer capable of forming a hydroxyl group as mentioned above may be obtained by a well known suspension polymerization, emulsion polymerization or solution polymerization process.

The proportions of the vinyl monomer having a nitrile group, the monomer having a hydroxyl group and/or the monomer capable of forming a hydroxyl group and any other unsaturated monomer properly introduced as required to form the vinyl copolymer in the present invention are properly determined by the amount of the lactone unit to be contained in the produced lactonized polymer or the amount of introduction of the above mentioned unsaturated monomer and are difficult to define at once, but generally it is preferable that the polymer contains more than 50 mol % of the vinyl monomer having a nitrile group. On the other hand, there can be used a vinyl copolymer of a composition consisting of less than 50 mol % of a vinyl monomer having a nitrile group, the rest being a monomer having hydroxyl group and/or a monomer capable of forming a hydroxyl group and any other unsaturated monomer sometimes introduced as required.

Further, insofar as a markedly adverse effect on the lactonized polymer produced is avoided, a part of the vinyl monomer having nitrile group forming the vinyl copolymer can be replaced with an unsaturated monomer which can form carboxyl group such as acrylic acid or methacrylic acid esters e.g., methyl acrylate, ethyl acrylate, methyl methacrylate; acrylamides or derivatives thereof, e.g., acrylamide or methacrylamide so that the carboxyl group formed by the lactonizing reaction of this invention may also be utilized to form lactone rings.

The formation of lactone rings in the main chain of a high molecular weight polymer or its shaped article restricts the mobility or freedom of the molecular chain. Therefore, such article as a fiber or film shaped from a copolymer having such cyclized structure or directly introduced by the lactonizing treatment according to the present invention is more improved in such physical and chemical properties as the tendency to elongation in hot water, strength and Young's modulus than the one made from an ordinary copolymer having no cyclized structure (that is, from a copolymer not lactonized by the acid-treatment), and is provided with a remarkable flame-resistance very little in the generation of toxic gases.

The following examples are given for the illustration of the present invention and not to limit the scope of the present invention. The percentages and parts in the examples are all based on the weight unless otherwise specified. Further, the amount of lactone unit mentioned in the examples is represented by the percentage by weight in the polymer of a group:

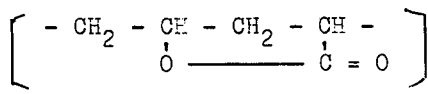

This analysis was conducted on an infrared ray absorption band of 1,176 cm$^{-1}$ of a lactonizd polymer obtained by using as a standard a copolymer of a known lactone amount synthesized from a copolymer of a methyl acrylate and vinyl acetate by a method mentioned on pages 142 to 154 of "Chemistry of High Polymers" ("Kobunshi Kagaku" in Japanese) Vol. 7 (1950).

EXAMPLE 1

Ten parts of an acrylic copolymer consisting of 79.5 % acrylonitrile, 20 % vinyl acetate and 0.5 % methallyl sulfonic acid were dispersed in 100 parts of a 20 % aqueous solution of sulfuric acid containing each of various amounts of each of various metal salts shown in Table 1. The suspension was boiled for 1 or 2 hours while being agitated. Then the lactonized polymer was washed with water and dried. The lactone unit contents in the obtained lactonized polymers as indicated in Table 1.

Table 1

| Metal salt | Amount of addition (mol/liter) | Lactone unit contents (%) Treated for 1 hour | Treated for 2 hours |
|---|---|---|---|
| No addition | — | 5.4 | 11.2 |
| Zinc chloride | 0.2 | 11.5 | 17.0 |
| Zinc chloride | 0.5 | 12.7 | 19.7 |
| Zinc sulfate | 0.1 | 8.3 | 11.5 |
| Zinc nitrate | 0.05 | 9.5 | 16.0 |
| Zinc nitrate | 0.2 | 14.2 | 18.0 |
| Zinc chlorate | 0.1 | 11.5 | 15.6 |
| Zinc perchlorate * | 0.01 | 11.0 | 15.5 |
| Zinc perchlorate * | 0.05 | 18.4 | 20.5 |
| Zinc perchlorate * | 0.1 | 19.2 | 20.8 |
| Cadmium perchlorate * | 0.1 | 16.5 | 18.9 |
| Copper perchlorate * | 0.1 | 15.0 | 18.4 |

*: The sulfate and perchlorate of each metal were used as mixed.

As evident from the results shown in Table 1, when a small amount of a metal ion is present in the acid-treating medium, the lactonizing reaction is remarkably accelerated. Particularly, the perchlorate showed a remarkable effect.

EXAMPLE 2

Twenty parts of a copolymer consisting of 89 % acrylonitrile and 11 % vinyl acetate were dispersed in 100 parts of a 10 % aqueous solution of perchloric acid, and then 1 part of zinc sulfate was added thereto. The mixture was boiled for 1 hour while stirring. The polymer was washed with water and dried to obtain a lactonized polymer of a lactone unit content of 10 %. On the other hand, the lactone unit content in a polymer treated in the same manner without adding zinc sulfate w 6 %.

EXAMPLE 3

A spinning solution was prepared by dissolving 10 parts of the same copolymer as in Example 2 in 90 parts of a 45 % aqueous solution of sodium thiocyanate and was extruded for coagulation into a 12 % aqueous solution of sodium thiocyanate at −3°C. through a nozzle of 12,000 orifices of an orifice diameter of 0.09 mm. The thus obtained fiber was stretched twice the original length in this coagulating bath, washed with water, then stretched 10 times the length in boiling water, and then dried in hot air at 115°C. under a relative humidity of 20 % and was then relaxed in pressurized steam at 117°C. Ten parts of the fiber were dipped in 1,000 parts of a 20 % aqueous solution of sulfuric acid, to which were added 1.6 parts of zinc sulfate and 3.3 parts of 60 % perchloric acid. The treatment was conducted at 100°C. for 2 hours and the treated fiber was washed with water. The thus treated fiber was further dipped in an aqueous solution of sodium hydroxide of a pH of 10 at 80°C. for 1 minute and was then washed with water and dried.

The thus obtained fiber contained 9.5 % of the lactone unit and was of a breaking strength of 3.5 g./d. and an elongation at break of 42 %.

On the other hand, for comparison, the lactone unit content in a fiber treated under the same conditions without adding zinc sulfate was 6 %.

EXAMPLE 4

Twenty parts of a copolymer consisting of 60 % acrylonitrile, 15 % vinyl acetate and 25 % vinylidene chloride were dissolved in dimethylformamide. The solution was then spread on a glass plate and heated at 80°C. under a reduced pressure to remove dimethylformamide to make a film of a thickness of 20 microns. The thus obtained film was dipped in an aqueous solution containing 10 % sulfuric acid, 10 % paratoluene sulfonic acid and 1.6 % zinc sulfate and 2 % perchloric acid at 100°C. for 2 hours to obtain a film containing 16 % of the lactone unit.

On the other hand, when the lactonizing reaction was carried out without making zinc sulfate present in the acid-treating medium, only 9 % of the lactone unit was formed in the film.

EXAMPLE 5

Five parts of an alternating copolymer consisting of 25 mol % acrylonitrile, 25 mol % methyl acrylate and 50 mol % vinyl acetate prepared in a manner disclosed in U.S. Pat. Appln. Ser. No. 22,997 were dissolved in 80 parts of acetonitrile. To the solution were added 15 parts of sulfuric acid, 5 parts of water, 0.8 part of zinc sulfate and 1.7 parts of 60 % perchloric acid. The treatment was conducted at 82°C. for 1 hour and then the mixture was poured into a large amount of water. The polymer was separated, washed with water and dried. The lactone unit content in the thus obtained lactonized polymer was 81 %.

On the other hand, for comparison, the lactone unit content in a polymer treated under the same conditions without adding zinc sulfate was 55 %.

What we claim is:

1. In a method for lactonizing a vinyl copolymer produced from a vinyl monomer containing a nitrile group and at least one monomer selected from the group consisting of monomers containing a hydroxyl group or capable of producing a hydroxyl group by treating said copolymer or fibers or films shaped therefrom with an acid medium having a pH less than 2 so that lactone rings are formed in the copolymer, the improvement wherein a metal component selected from the group consisting of copper, zinc and cadmium, and oxides, halides, halogen acid salts, nitrates, sulfates, phosphates, sulfonates and carboxylates of said metals is added to the acid medium to accelerate the lactonizing reaction in the copolymer, said metal component being added in such amounts that it is present in the acid medium in a concentration of 0.001 mol/liter to 5 mol/liter.

2. A method as claimed in claim 1 wherein the vinyl monomer containing a nitrile group is selected from the group consisting of acrylonitrile and methacrylonitrile.

3. A method as claimed in claim 1 wherein the content of the vinyl monomer containing a nitrile group in the vinyl copolymer is 50 mol % or higher.

4. A method as claimed in claim 1 wherein the monomer having a hydroxyl group is selected from allyl alcohol and methallyl alcohol.

5. A method as claimed in claim 1 wherein the monomer capable of forming a hydroxyl group is selected from the group consisting of vinyl or allyl compounds of carboxylic acids, of ethers and compounds thereof substituted with halogen atoms, hydrocarbon groups or halohydrocarbon groups.

6. A method as claimed in claim 1 wherein the monomer capable of forming a hydroxyl group is a vinyl ester of fatty acid.

7. A method as claimed in claim 6 wherein said vinyl ester is vinyl acetate or vinyl propionate.

8. A method as claimed in claim 1 wherein the copolymer is produced from monomers which consist of (1) at least 50 % by mol of a monomer having a nitrile group, (2) at least one monomer containing a hydroxyl group or a monomer which can produce a hydroxyl group and (3) at least one monomer selected from the group consisting of allyl sulfonic acid, methallylsulfonic acid and their salts, styrene, vinyl chloride, vinyl bromide and vinylidene chloride.

* * * * *